(12) United States Patent
Scheiwiller

(10) Patent No.: US 6,360,635 B1
(45) Date of Patent: Mar. 26, 2002

(54) NUT FOR ACCOMMODATING THE HEAD OF A FASTENING ELEMENT OR FOR INSERTING INTO THE SAME

(75) Inventor: Felix Scheiwiller, Altstätten (CH)

(73) Assignee: SFS Industrie Holding AG, Heerbrugg (CH)

( * ) Notice: Subject to any disclaimer, the term of this patent is extended or adjusted under 35 U.S.C. 154(b) by 0 days.

(21) Appl. No.: 09/308,431

(22) PCT Filed: Nov. 5, 1997

(86) PCT No.: PCT/EP97/06099

§ 371 Date: May 19, 1999

§ 102(e) Date: May 19, 1999

(87) PCT Pub. No.: WO98/24595

PCT Pub. Date: Jun. 11, 1998

(30) Foreign Application Priority Data

Dec. 6, 1996 (DE) .......................................... 196 50 799

(51) Int. Cl.⁷ ............................................... B25B 13/12
(52) U.S. Cl. ............................... 81/128; 279/65; 279/74
(58) Field of Search .................... 81/128, 53.2; 279/65, 279/74, 60

(56) References Cited

U.S. PATENT DOCUMENTS

| 1,499,701 A | 7/1924 | Skeel |
| 1,807,264 A | 5/1931 | Walker |
| 2,555,836 A | 6/1951 | Werich |
| 4,213,355 A | 7/1980 | Colvin |
| 4,462,283 A | 7/1984 | Ito |
| 5,375,489 A | 12/1994 | McClure |

FOREIGN PATENT DOCUMENTS

| BE | 495 625 A | 8/1950 |
| DE | 847429 | 8/1952 |
| DE | 1603969 | 9/1971 |
| DE | 2014995 | 10/1971 |
| DE | 2521380 | 11/1976 |
| DE | 3924323 A | 1/1991 |
| EP | 0325728 A | 8/1989 |
| FR | 1101601 | 10/1955 |
| JP | 5810465 | 1/1983 |
| JP | 6225184 | 2/1987 |
| WO | WO95/22440 | 8/1995 |

Primary Examiner—D. S. Meislin
(74) Attorney, Agent, or Firm—Volpe and Koenig, P.C.

(57) ABSTRACT

A socket and/or insert (6) for accommodating a fastener head is inserted in a screwing attachment (1). The socket and/or insert (6) comprises two jaws (4, 5) which engage in a tubular holder (3) in which they are locked against rotation. The jaws can slide in axial direction relative to the holder (3). In their one end position, the jaws (4, 5) can be forced apart in radial direction for insertion of a fastener head. Under the effect of axial force in the direction of the arrow (23), the jaws (4, 5) are pressed into the holder (3), whereby the jaws are necessarily squeezed toward each other in radial direction by virtue of the tapered camming faces (12, 13), so that the inserted fastener head becomes firmly clamped.

5 Claims, 2 Drawing Sheets

NUT FOR ACCOMMODATING THE HEAD OF A FASTENING ELEMENT OR FOR INSERTING INTO THE SAME

BACKGROUND OF THE INVENTION

The invention relates to a socket for accommodating a head and/or an insert for insertion into a head of a fastener to be set and for holding the fastener as well as for driving the fastener during a setting process, wherein the socket and/or insert is provided with a plurality of jaws, which are disposed in succession in circumferential direction and which engage in a tubular holder, in which they are locked against rotation but can slide axially relative thereto between two end positions.

In the very act of setting self-tapping screws, relatively long boring times are repeatedly encountered due to the fact that appropriately high pressing pressure cannot be exerted in advance, since there exists a risk that the screw will tilt in the socket and/or insert, because on the one hand the screw heads have large manufacturing-related tolerances and because on the other hand the boring point slips along the workpiece. Under some circumstances a screw must be started repeatedly until the point of the boring part engages, especially on a smooth metal surface. Only then can full pressure be exerted on the driving device, and so the necessary boring pressure is available only from that instant on.

In the use of commercial sockets for setting fasteners, especially self-tapping fasteners, relatively long boring times are encountered in the case of one-hand operation merely because of the fact that the point of the boring part slips repeatedly, because otherwise there exists the risk that the fastener will tilt. If only light pressure can be exerted, on the other hand, the risk that the point will slip becomes substantially greater.

A socket with the features listed in the preamble of claim 1 is known from U.S. Pat. No. 4,213,355. This socket cannot be operated with one hand in order to clamp a fastener such as a screw in such a way that it is certain that the risk of tilting of the fastener from the socket during a setting process can be prevented from the very beginning. To clamp a nut, for which the known socket is mainly designed, a ratchet wrench must be held with one hand and an adjusting piece on the socket must be turned with the other hand, until the nut introduced beforehand between jaws is firmly clamped in the jaws. Thus one-hand operation becomes possible once the nut has initially been firmly clamped using both hands.

This is due to the fact that this known socket is constructed like a drill chuck, in which a sleeve must also be turned relative to the jaw holder in order to execute a clamping process. To clamp a screw, it would be additionally necessary to proceed very carefully and to exert considerable force in order to be certain that the risk of tilting from the socket during a setting process will be avoided from the very beginning.

From German Patent 847429 there is known a working head for power-operated screwdrivers for screwing stud bolts or stud screws into blind holes. The working head comprises two clamping jaws which are accommodated in a drive sleeve where they are axially slidable but locked against rotation and whose faces turned toward each other roll over each other to change the clamping faces from an open position to the closed position thereof, a front abutment which is allocated to the two clamping jaws, has the form of a first ball and is provided for a stud bolt to be accommodated and, on the sleeve, an end abutment which has the form of a second ball and which passes between the rear ends of the clamping jaws during their axial displacement by the stud bolt impinging on the front abutment and spreads them to close the clamping ends. The clamping ends are provided with internal threads and are open in a lower home position. When a stud bolt or the like is inserted into the working head, it presses the first ball upward into contact with the clamping jaws, which are thus pushed upward and are spread upwardly apart by the second ball. The clamping jaws thus swivel around the point of contact with the first ball, so that the clamping ends close downwardly around the stud bolt. The threaded engagement between clamping jaws and stud bolt allows for a certain tolerance without impairing the clamping process. However, if the clamping ends have internally smooth faces for clamping a fastener head, for example, clamping over an area would be possible only for a very well defined head size. In the event of any manufacturing-related deviation of the fastener head, only line contact would exist between this head and the clamping ends because of the pincer-like closing process of the clamping jaws, and this would not be sufficient to clamp such a fastener so firmly that it could not tilt during a setting process in which boring would have to take place.

SUMMARY OF THE INVENTION

The object of the invention is to provide a socket and/or insert of the type indicated in the preamble of claim 1, with which socket and/or insert a fastener can be gripped so simply and securely that the risk of tilting of the fastener from the socket and/or insert during a setting process is prevented from the very beginning.

This object is achieved according to the invention by the fact that, for accommodating a head and/or for insertion into a head, the jaws in their one end position can be forced apart or squeezed together in radial direction by the head, and the jaws, during application thereon of axial force directed toward the other end position, are necessarily squeezed together or forced apart in radial direction by mutual action between holder and jaws, and that, on the inside of the holder and/or on the outside surface of the jaws there are formed camming faces running taperingly relative to the central axis, and so the jaws can be squeezed toward each other by virtue of the camming faces during axial insertion into the holder.

In the socket and/or insert according to the invention, the jaws are moved parallel to each other during the clamping process. Regardless of possible tolerances in the dimensions of a fastener head, this is therefore always clamped over areas extending the entire head length and parallel to the axis thereof, the firmness of such clamping increasing with magnitude of the axially exerted force. When appropriate full pressure is exerted on the driving tool during starting of the fastener or of the boring part of the fastener on a substructure, the jaws move into their holder due to this application of axial force and therein are necessarily squeezed together in radial direction by virtue of special interlocking structures, so that the screw head is firmly clamped in vise-like manner. Thus, as long as appropriate full pressure is exerted by the driving tool on the fastener, the fastener head remains firmly clamped, and so on the one hand tilting of the fastener in the socket and/or insert is precluded and on the other hand it is ensured by the firm clamping action that the point of a boring part of a fastener penetrates directly at the started region without any slipping of the point. Thus the hole is always bored at the desired location.

Because of the excellent clamping of the screw head in the socket and/or insert and the fact that the point of the boring part of the fastener is thereby guided correctly, the full pressure can be applied from the very beginning.

It has even been shown in experiments that boring and driving of a screw oriented at an acute angle to the workpiece surface is also possible if necessary without slipping of the point of the boring part. The point of the boring part penetrates immediately into the workpiece directly at the started position precisely because full pressure can be applied from the very beginning.

By means of the camming faces, which run taperingly relative to the central axis on the inside of the holder and/or on the outside surface of the jaws, the jaws can be squeezed against each other by virtue of the camming faces during axial insertion into the holder, and a correspondingly amplified radial force is already exerted on the fastener head without application of excessive axial force, so that the fastener head is firmly clamped immediately after the point of the boring part of the fastener has been started. Thus, by means of the tapered camming face, there is achieved appropriate force amplification, by which optimal clamping and also appropriate axial alignment between the axis of rotation of the driving tool and the central axis of the fastener are produced.

In this connection, it is expedient for tapered camming faces to be provided both on the holder and on the jaws. Because the camming faces are designed to correspond to each other, they can bear on each other over a relatively large area and thus optimum force transfer is also achieved during axial insertion of the jaws into the holder.

In one advantageous embodiment, the jaws are squeezed together in radial direction under spring loading. Consequently the jaws remain in their rest position, or in other words bearing against each other even when not forcibly squeezed together, so that they are forced apart resiliently during insertion of the fastener head. Thereby it is guaranteed that the fastener head will at first be held in the socket and/or insert by the spring action alone, and so even fasteners directed downward can be set without problems, because the fastener will be held sufficiently firmly by the resilient structure of the jaws. To set the fastener, and thus during the boring process, appropriate axial pressure is exerted, so that the action of the camming faces begins only then and the fastener head is necessarily clamped between the jaws of the socket and/or insert.

It is further proposed that the jaws forming the socket and/or insert are spring-loaded axially outward from the holder. Thereby it is ensured that the jaws always release and return to their rest position after the end of a driving process.

A simple alternative embodiment provides that the jaws are squeezed resiliently toward each other by an O-ring placed in a groove on the outer circumference of the jaws.

When it is further proposed that the groove for accommodating the O-ring be formed in the region of the tapered camming face, then a geometry which is structurally very simple and effective can be created. The region which inherently flares conically already because of the tapered camming faces is utilized appropriately, since here the relatively largest material thickness is available for making such a groove. Moreover, the additional advantage is obtained thereby that the inserted O-ring acts precisely in that region in which it is desired, namely in that region in which the fastener head is held between the jaws.

In the embodiment in which the jaws have the form of circular sectors and together form a cylindrical structural member on the whole, the advantage is obtained that a kind of encircling truncated cone can be formed both in the holder and in the socket and/or insert or jaws of the socket and/or insert, so that radial forces act all around on the jaws when the socket and/or insert is pushed axially into the holder.

In order that sticking or jamming of the socket and/or insert in the holder itself cannot occur, it is provided in a simple structural embodiment that a circumferential groove is formed at the transition between the tapered camming face on the holder and the accommodating region in which the jaws are fixed to be driven in rotation therewith. This guarantees that only the tapered camming faces of the holder and of the jaws are braced against each other at all times, and that these tapered camming faces of the jaws can never penetrate into the accommodating region disposed therebehind in which the jaws are fixed to be driven in rotation therewith.

According to a special embodiment, it is provided that the jaws together form a kind of pot-like socket and/or insert, wherein webs projecting toward the central axis at the end of the jaws facing away from the accommodation for the fastener head form a stop for the head of a fastening screw, the head limiting the axial movability of the socket and/or insert formed from the jaws. Inherently there is needed only a very short distance of relative positionability between the socket and/or insert and the holder in order to have the capability of inserting the fastener head and in order to clamp the fastener head optimally during starting of the point of the boring part of the fastener. Under certain circumstances an axial movability of 1 to 2 mm is sufficient on the one hand for the jaws to be disposed in a sufficiently loose position and on the other hand for proper bracing to be achieved.

A further advantage is obtained from the small axial movability, in that the O-ring inserted at the outside circumference of the jaws is covered by the holder itself when the jaws are in assembled position. Thus the O-ring is also held captively. By virtue of the arrangement of a fastening screw, a very simple structural geometry is inherently obtained for the holder of the jaws forming the socket and/or insert, wherein the additional advantage is achieved that the arrangement according to the invention plus the socket and/or insert is not substantially larger than a commercial socket and/or insert for inserting and driving fasteners.

So that exact loosening of the jaws of the socket and/or insert is always ensured, meaning that, after completion of the boring or screwing process, the socket and/or insert returns to the starting position in which the screw head can be extracted from the socket and/or insert and in which the jaws of the socket and/or insert can be forced radially outward, it is expedient to provide, encircling the fastening screw between holder and socket and/or insert, a spring such as a stack of cup springs, a helical spring, a spring lock washer or the like to provide axial spring loading of the jaws. In this way it is possible to select a structural geometry which nevertheless ensures a very small construction.

BRIEF DESCRIPTION OF THE DRAWINGS

Practical examples of the invention will be explained in more detail in the following description with reference to the drawings, wherein.

DETAILED DESCRIPTION OF THE PREFERRED EMBODIMENTS

Figure 1:
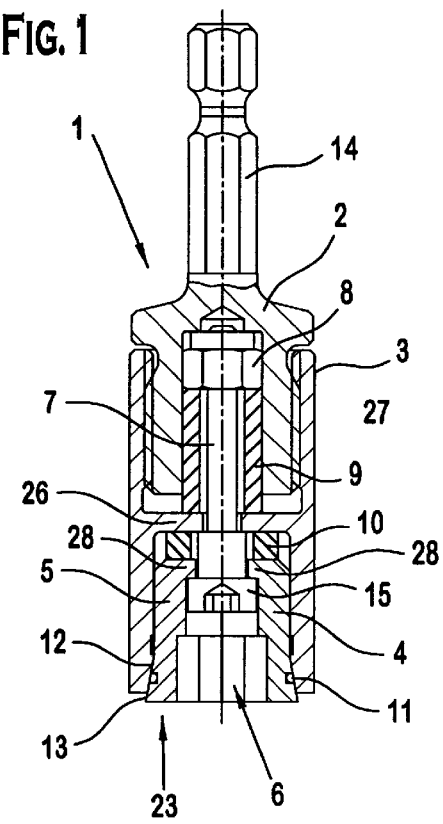
FIG. 1 shows a longitudinal section through a screwing attachment which can be inserted into a driving tool and in which a socket and/or insert is inserted at the free end.
Figure 2:
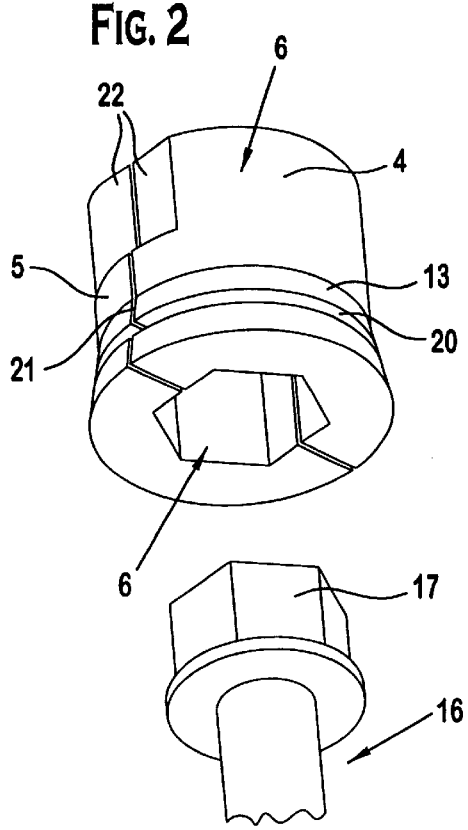
FIG. 2 shows an enlarged diagram of a socket and/or insert in oblique view with a screw head which can be inserted therein.
Figure 3:
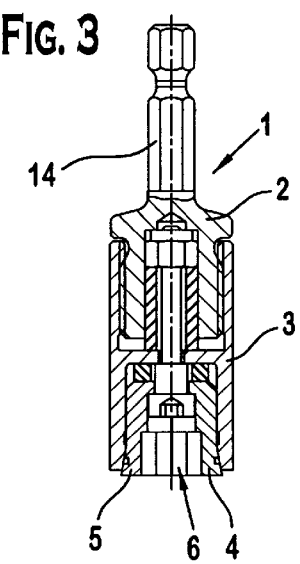
FIG. 3 shows the same embodiment as FIG. 1, or in other words the arrangement in finally assembled form.
Figure 4:
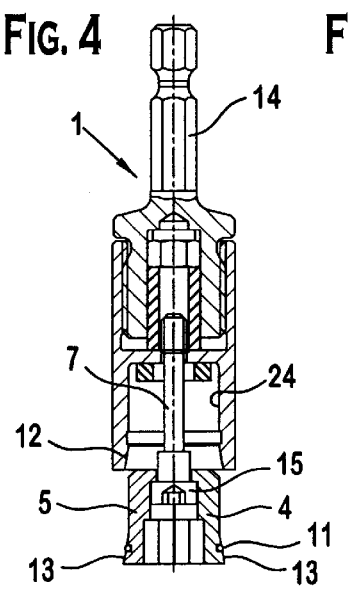
FIGS. 4 and 5 show the assembly and disassembly capability of the jaws of the socket and/or insert.
Figure 9:
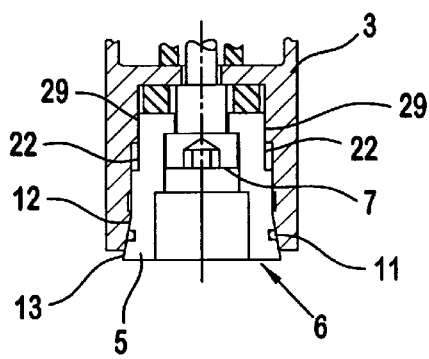
FIG. 9 is a cross-sectional view taken along lines 9—9 in FIG. 1.

In screwing attachment 1 according to FIGS. 1 to 5 there is shown a socket and/or insert 6 which acts to accommodate a fastener head 17 and to hold the same during a boring and/or thread cutting process and/or during a process of driving a fastener 16. In the illustrated example, socket and/or insert 6 is formed from two jaws 4 and 5, which are disposed successively in circumferential direction and which in this case extend over a sector of approximately 180°. It is also entirely possible, however, to provide snore than two such jaws, an example being the use of a hexagon-head fastener, in which case there could be provided three or six jaws, each of which on its own would encompass two adjacent drive regions or one drive region of the fastener head. Socket and/or insert 6 is inserted in a sleeve-like holder 3 in which it is locked against rotation, although the rotationally locking holder cannot be seen directly from the drawings. In the diagram according to FIG. 2 is it evident that there are provided flattened portions 22, which bear against corresponding cams or against flat regions 29 of holder 3 projecting into the interior as shown in FIG. 9. The diagrams in the drawings are not necessarily suitable for recognizing that entirely appropriate clearance is present between holder 3 and the outside wall of jaws 4 and 5, because jaws 4 and 5 can be moved apart radially in the front rest position of the socket and/or insert. Accordingly, in their one end position in which they extend the maximum region from holder 3, the jaws can be forced apart in radial direction, so that fastener head 17 can be inserted.

When axial force is applied in the direction of arrow 23, or in other words when the point of a boring part of a fastener 16 encounters the workpiece to be bored, jaws 4 and 5 are moved axially into holder 3, whereupon jaws 4, 5 are radially squeezed toward each other by appropriate interlocking features. By this axial movement and the application of force in radial direction, inserted fastener head 17 is clamped as if in a vise. The interlocking features for bringing about this forced movement toward each other are achieved by forming camming faces 13 running taperingly relative to the central axis at least on the outside surface of jaws 4, 5, so that the jaws are moved toward each other by axial insertion into holder 3. It is advantageous, however, when tapered camming faces 12 and 13 are provided both on holder 3 and on jaws 4 and 5.

The jaws are squeezed together in radial direction under spring loading, wherein this feature is effective only in the rest position of the jaws, or in other words in the end position pointing out of holder 3. By virtue of the spring-loaded design, fastener head 17 can be pressed into socket and/or insert 6 in simple manner, since the two jaws 4 and 5 are able to move apart slightly. An advantageous construction will provide a groove 20 and an O-ring 11 placed in this groove, so that such a springloaded embodiment is also obtained in simple manner. Groove 20 for receiving O-ring 11 is provided in the region of tapered camming faces 13, so that O-ring 11 is held captively and covered from the outside when socket and/or insert 6 is in assembled position.

Jaws 4, 5 are designed as circular sectors—and therefore each extends over approximately 180° in the illustrated example—and thus together form a cylindrical structural member on the whole. For manufacturing reasons, and also for a reliable principle of action in the region of the sloping camming faces, it is practical for a circumferential groove 19 to be formed at the transition between tapered camming face 12 on holder 3 and accommodating region 24 in which the jaws are fixed to be driven in rotation therewith.

To ensure that, after each setting process for a fastener, socket and/or insert 6 reliably returns to the front end position, where jaws 4, 5 therefore can be swiveled resiliently apart to a slight extent once again, there is provided in the interior of holder 3 an appropriate spring 10, which in the example according to FIGS. 1 to 5 is constructed as a kind of spring lock washer. It would also be conceivable, however, to use cup springs or an appropriate stack of cup springs instead of spring lock washer 10. In the embodiment according to FIGS. 6 to 7 there is provided in structurally simple manner a helical spring 18, which protrudes an appropriate distance further into a bore 25 of holder 3 in order to achieve an appropriate spring travel. Naturally appropriate stacks of cup springs can be provided in these embodiments as well. The only substantial requirement is that jaws 4, 5 forming the socket and/or insert are spring-loaded axially out of holder 3, in order to push socket and/or insert 6 back into the initial position at all times.

In a screwing attachment according to FIGS. 1 to 5 there is provided an appropriately formed stud 14, which can be inserted into the drive part of a driving tool or can be clamped therein. In the present example, holder 3 is screwed onto a head 2, or in other words holder 3 is a sleeve which is open at both ends and has an appropriate intermediate web 26. Jaws 4, 5 have webs 28 which point toward central axis 27 and which act as stops for head 15 of a fastening screw 7. Socket and/or insert 6 is held in its inserted position in holder 3 by means of fastening screw 7, a spacer sleeve 9 and a nut 8 also being inserted in this embodiment in order to set the joint with appropriate precision. Screw head 15 therefore forms the limit of axial movability of jaws 4, 5 in holder 3.

Figure 5:
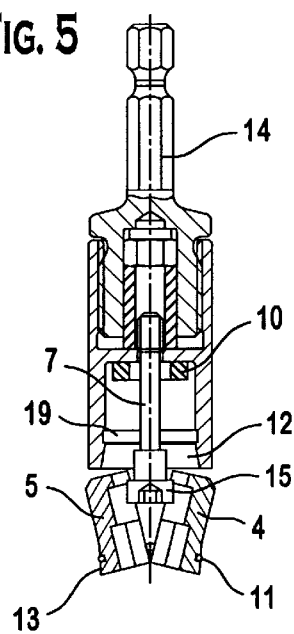
Figure 6:
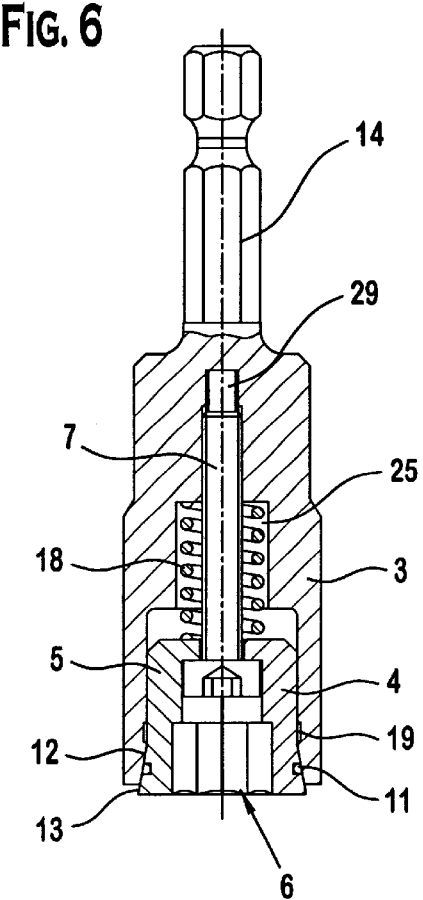
FIG. 6 to FIG. 8 shows another alternative embodiment of a screwing attachment with an inserted socket and/or insert, the diagram of FIG. 6 being enlarged, FIG. 7 showing a diagram in full size and FIG. 8 showing the parts of this screwing attachment in the disassembled condition.
Figure 7:
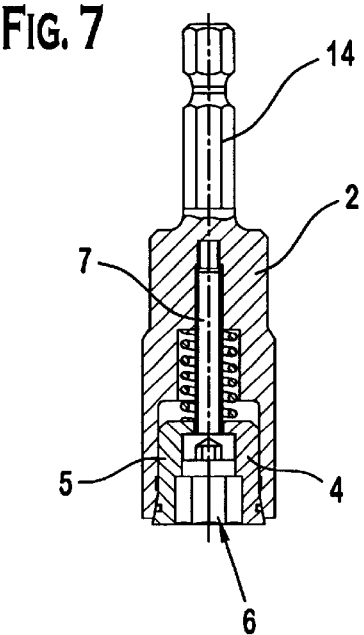
Figure 8:
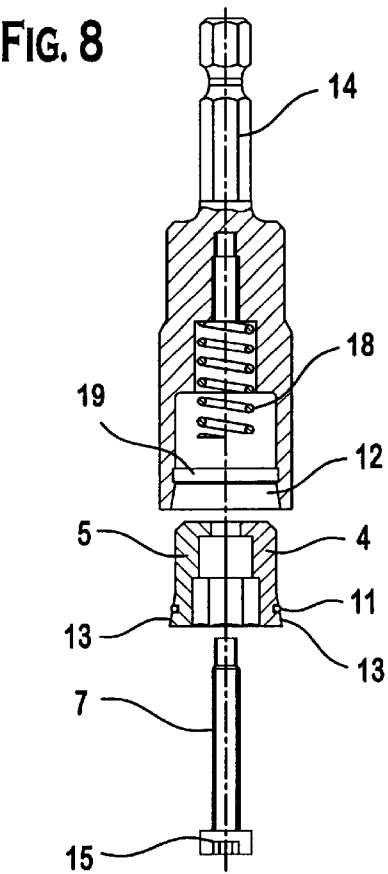

In the embodiment according to FIGS. 6 to 8, fastening screw 7 is merely driven into an appropriate threaded bore 29, in which appropriate stops can be provided in order to prevent fastening screw 7 from being driven too far. Appropriate axial movability of socket and/or insert 6 must still be ensured, of course. In this embodiment, fastening screw 7 is completely screwed out during corresponding assembly or disassembly, so that individual jaws 4, 5 of socket and/or insert 6 can be removed. In contrast, complete disassembly is not necessary in the embodiment according to FIGS. 1 to 5 because, as can be seen in FIG. 5, jaws 4, 5, which are held together resiliently, can be swiveled outward after fastening screw 7 has been screwed out an appropriate distance.

Several structural variants are certainly possible, but it is always necessary that socket and/or insert 6 be formed from two or more jaws which are squeezed toward each other by appropriate axial pressure, in order thereby to clamp the fastener head. In the drawing, socket and/or insert 6 is illustrated in inserted condition together with a screw head. Depending on geometry of socket and/or insert 6, it is also possible to provide an insert for other fasteners. Thus it would be conceivable to insert such a socket and/or insert in a setting device for self-tapping blind rivets, or also for self-tapping dowels.

In the foregoing description, it is assumed that the socket and/or insert is designed for use in a fastener head with external drive. However, it is also entirely conceivable, by appropriate inversion, to use the structural features for a fastener head with internal drive as well. In this case, however, the socket and/or insert to be inserted in the internal drive of the fastener head would have to comprise two or more jaws which are forced radially apart from each other by application of appropriate axial forces during setting of the point of the boring part, in order thereby to achieve the same effect as for an external drive. In such an arrangement, the jaws could be capable of being radially squeezed together resiliently in order to achieve insertion of the socket and/or insert or the jaws of the socket and/or insert, in order to facilitate introduction. As soon as the force is completely exerted by the driving tool, these jaws would necessarily be forced apart from each other in radial direction, so that the fastener head would be appropriately clamped.

What is claimed is:

1. A socket for holding a head (17) of a fastener to be set and for driving the fastener during a setting process, comprising a plurality of jaws (4, 5) disposed in succession in a circumferential direction and which are engaged in a tubular holder (3), a camming face (12 or 13) that is tapered relative to a central axis formed on at least one of an inside of the holder (3) and an outside surface of the jaws (4, 5), the jaws being locked against rotation and slidable axially relative to the holder (3) between first and second axial end positions, in the first end position, the jaws (4, 5) being movable outwardly against an axial resilient spring to provide for accommodation of the fastener head (17) by said jaws and, upon application of an axial force on the jaws (4, 5) directed toward the second end position, the jaws are squeezed together in the radial direction by mutual action between said camming face and the other of the inside of the holder (3) and the outside surface of the jaws (4, 5), and an O-ring (11) placed in a groove (20) on an outer circumference of the jaws (4, 5) for squeezing the jaws (4, 5) resiliently toward each other.

2. A socket according to claim 1, wherein the groove (20) for the O-ring (11) is formed in a region of the tapered canning face (13).

3. A socket according to claim 1, wherein the spring is a helical spring.

4. A socket according to claim 1, wherein the spring is a spring lock washer.

5. A socket for holding a head (17) of a fastener to be set and for driving the fastener during a setting process, comprising a plurality of jaws (4, 5) disposed in succession in a circumferential direction and which are engaged in a tabular holder (3), a camming face (12 or 13) that is tapered relative to a central axis formed on at least an inside of the holder (3), the jaws being locked against rotation and slidable axially relative to the holder (3) between first and second axial end positions, in the first end position, the jaws (4, 5) being movable radially outwardly against an axial resilient spring to provide an accommodation for the fastener head (17) by said jaws and, upon application of an axial resilient force on the jaws (4, 5) directed toward the second end position, the jaws are squeezed together in the radial direction by mutual action between said camming face (12 or 13) and an outside surface of the jaws (4, 5); and a circumferential groove (19) being formed at a transition area between the tapered camming face (12) on the holder (3) and said accommodation, and socket means (6) formed by said jaws (4, 5) in said region to be driven in rotation therewith.

* * * * *

UNITED STATES PATENT AND TRADEMARK OFFICE
CERTIFICATE OF CORRECTION

PATENT NO. : 6,360,635 B1
DATED : March 26, 2002
INVENTOR(S) : Felix Scheiwiller It is certified that error appears in the above-identified patent and that said Letters Patent is hereby corrected as shown below:

Title page,
Item [54], change the title to read as follows: -- SOCKET FOR CONNECTION TO THE HEAD OF A FASTENER --

Column 8,
Line 10, change the word "canning" to -- camming --.

Signed and Sealed this

Seventeenth Day of September, 2002

Attest:

Attesting Officer

JAMES E. ROGAN
*Director of the United States Patent and Trademark Office*